United States Patent [19]

Mattison et al.

[11] Patent Number: 5,319,388
[45] Date of Patent: Jun. 7, 1994

[54] VGA CONTROLLED HAVING FRAME BUFFER MEMORY ARBITRATION AND METHOD THEREFOR

[75] Inventors: Phillip E. Mattison, Gilbert; Kenneth P. Caviasca, Phoenix, both of Ariz.

[73] Assignee: VLSI Technology, Inc., San Jose, Calif.

[21] Appl. No.: 902,323

[22] Filed: Jun. 22, 1992

[51] Int. Cl.[5] .............................................. G09G 1/02
[52] U.S. Cl. ....................................... 345/190; 345/200
[58] Field of Search ............... 340/750, 799; 345/190, 345/200

[56] References Cited

U.S. PATENT DOCUMENTS

| | | | |
|---|---|---|---|
| 4,511,965 | 4/1985 | Razaram | 340/750 |
| 4,594,587 | 6/1986 | Chandler | 340/750 |
| 4,718,024 | 1/1988 | Guttag | 340/729 |
| 4,744,046 | 5/1988 | Foster | 340/750 |
| 4,752,893 | 6/1988 | Guttag | 364/518 |
| 4,809,166 | 2/1989 | Cooper | 340/720 |
| 4,870,491 | 9/1989 | Ishii | 340/750 |
| 4,916,654 | 4/1990 | Sherman | 364/900 |
| 4,945,499 | 7/1990 | Asari | 364/521 |
| 4,959,803 | 9/1990 | Kiyohara | 340/750 |
| 4,965,750 | 10/1990 | Matsuo | 364/521 |
| 4,992,960 | 2/1991 | Yamaoka | 364/521 |
| 5,036,475 | 7/1991 | Ueda | 340/747 |
| 5,043,921 | 8/1991 | Gonzalez-Lopez | 364/522 |
| 5,065,343 | 11/1991 | Inoue | 340/798 |
| 5,068,648 | 11/1991 | Chiba | 340/750 |

Primary Examiner—Alvin E. Oberley
Assistant Examiner—Minsun Oh
Attorney, Agent, or Firm—Harry M. Weiss & Associates

[57] ABSTRACT

An improved VGA Controller with Arbitration Logic and method therefor is provided to enhance system performance by efficiently using the minimum amount of bus bandwidth required. This Controller includes a bus to the Frame Buffer that either the system CPU or the Display Controller may access and control. The Display Controller includes a Display FIFO which stores display data from the Frame Buffer for the Display Controller to use. This Display FIFO coupled with the Arbitration Logic makes it possible for the Display Controller to continue to output display data even when the system CPU is accessing the display data in the Frame Buffer. The Arbitration Logic attempts to keep the Display FIFO as full as possible such that a bus request by the system CPU can be immediately granted when received.

2 Claims, 1 Drawing Sheet

VGA CONTROLLED HAVING FRAME BUFFER MEMORY ARBITRATION AND METHOD THEREFOR

FIELD OF THE INVENTION

This invention generally relates to graphic displays and methods therefor, and more specifically relates to an improved Video Graphics Adapter (VGA) Controller having arbitration logic to provide bus access to the Frame Buffer so that both the system Central Processing Unit (CPU) and the Display Controller may independently access the required data in the Frame Buffer in a manner that utilizes the available system bus bandwidth efficiently, thereby increasing system performance. This improved VGA Controller and method uses a First-In First-Out (FIFO) buffer memory to supply data to the Display Controller, which allows the Display Controller to continue to output display data out of the display FIFO while the CPU has control of the bus and is directly accessing data in the Frame Buffer.

DESCRIPTION OF THE PRIOR ART

In a memory-mapped video display system such as that used in conjunction with a typical VGA Controller, it is necessary to arbitrate between the CPU and Display Controller access to the Frame Buffer memory. The simplest method used in the prior art was to use a dual-port video Dynamic Random Access Memory (DRAM) as the Frame Buffer with the CPU coupled to one port and the Display Controller coupled to the second port. The arbitration logic of the dual-port video DRAM would then resolve any access conflicts that arose. This design was simple to implement and effective, yet was undesirable for commodity VGA controllers because of the relatively high cost associated with dual-port video DRAMs.

A more economical method commonly used in prior art VGA controllers was to use a standard DRAM for the Frame Buffer, and assign a fixed portion of the available display bus bandwidth to the CPU. While this avoided the need for arbitration, the design was inefficient because the CPU does not always use available display bus cycles, and has to wait if a cycle request does not coincide with an available display bus cycle.

U.S. Pat. No. 4,945,499 discloses a display system that allows the CPU and Display Controller to each take control of the bus to transfer the needed data to and from the Segment Buffer, which acts as a Frame Buffer. This display system operates in a sequential manner, with the CPU giving control of the bus to the Graphics Display Controller (GDC) once it has concluded its operations. The GDC then performs several functions, and gives control of the bus back to the CPU when finished. There is no arbitration as such for the bus since the access is sequential and synchronous. This configuration is very inflexible, and inefficiently uses only a small portion of the bandwidth of the system bus.

U.S. Pat. No. 5,065,343 discloses a graphic display system that uses a FIFO to allow several Display Controllers to continue processing display data while the CPU is servicing one of the other Display Controllers. This FIFO is the port of communication to all portions of the Display Controller, including the Frame Buffer. All data flowing between the CPU and the Display Controller must go through this FIFO. For the CPU to access data in the Frame Buffer of one of the Display Controllers, the CPU would have to request the Display Processor to transfer this data through the FIFO to the CPU. This configuration does not allow the CPU to directly access the Frame Buffer. Rather, it increases the data transferred on the bus which decreases system performance, and provides a system bottleneck defined by the size of the FIFO and the rate at which data is transferred through the FIFO. This configuration is not needed or useful when only one Display Controller is used, which is the most common application. In addition, there is no arbitration scheme since the CPU bus is physically isolated from the Display Controller bus by the FIFO.

Therefore, there existed a need to provide an improved VGA Controller with Frame Buffer Memory Arbitration and method therefor which allows the CPU to directly access the Frame Buffer when data is required. This Controller allows the CPU and Display Controller to perform independently and asynchronously from one another, which maximizes the system performance and available bus bandwidth. This Controller also provides a high probability that the CPU will get relatively fast access to the Frame Buffer while assuring the data requirements of the Display Controller are met, since the Display Controller stores data from the Frame Buffer into the Display FIFO when it has access of the bus, and continues to output this data from the Display FIFO even when the CPU has control of the bus and is accessing data in the Frame Buffer.

SUMMARY OF THE INVENTION

It is an object of this invention to provide an improved VGA Controller and method therefor which has a bus to the Frame Buffer by which both the Display Controller within the VGA Controller and the system CPU can access data in the Frame Buffer, which Display Controller also has arbitration logic to allow the Display Controller and the CPU to each take over the bus when required.

It is another object of this invention to provide an improved VGA Controller and method therefor which has a Display FIFO to act as a buffer for display data to assure the Display Controller may continue to output display data for a period even when the CPU has taken control of the bus to access the Frame Buffer.

According to the present invention, an improved VGA Controller is provided. This VGA Controller has a data bus which provides access to the Frame Buffer that is shared by the system CPU and the Display Controller. Arbitration Logic is included within the Display Controller to provide access to the Controller Bus servicing the Frame Buffer as the CPU and Display Controller require. The Arbitration Logic includes control to a Display FIFO which is used to provide data to the Video Shift Logic as required.

The Arbitration Logic transfers display data from the Frame Buffer to the Display FIFO, which supplies display data to the Display Controller. When the CPU needs to access data in the Frame Buffer, it requests access to the bus via Bus Arbitration lines. If the Display FIFO is filled past a certain level, the CPU request will be granted immediately. While the CPU has control of the bus and is transferring data to or from the Frame Buffer, the Display Controller continues to output display data from the data previously stored in the Display FIFO. When the CPU no longer needs to access the Frame Buffer, it relinquishes control of the bus via the Bus Arbitration lines. Arbitration Logic then takes control of the bus to the Frame Buffer, and proceeds to refill the Display FIFO until the CPU needs to access the Frame Buffer once again.

This method of providing display data to the Display Controller and providing CPU access to the Frame Buffer has many advantages. The Display Controller runs asynchronously to the CPU. This feature coupled with the Display FIFO allows the Arbitration Logic to quickly grant a CPU request while continuing to output display data. In this manner the CPU has quick access to the data in the Frame Buffer when needed, while only utilizing the minimum amount of bus bandwidth.

The foregoing and other objects, features and advantages will be apparent from the following description of the preferred embodiment of the invention as illustrated in the accompanying drawings.

DESCRIPTION OF THE PREFERRED EMBODIMENT

Figure 1:
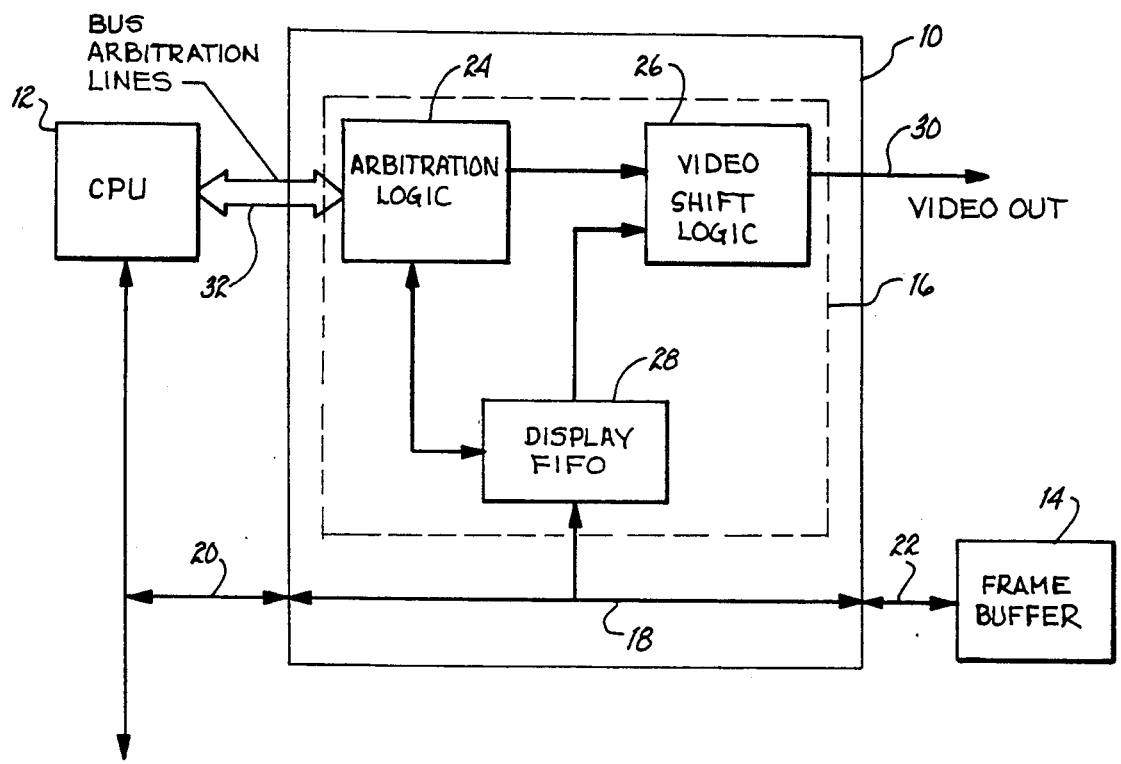
FIG. 1 is a block diagram of the improved VGA Controller of the present invention in a typical configuration coupled to a CPU and Frame Buffer.

The improved VGA Controller 10 of the present invention is shown in FIG. 1 with a CPU 12 and Frame Buffer 14 in a typical configuration. VGA Controller 10 includes Display Controller 16 with a Controller Bus 18 coupled to Frame Buffer Bus 22 and CPU Bus 20 as shown. The Display Controller 16 comprises Arbitration Logic 24, Video Shift Logic 26, and a Display FIFO 28 as shown. The Video Shift Logic 26 has a Video Out output 30 which drives the video input of a typical VGA monitor or display device.

The Arbitration Logic 24 determines whether the Display Controller 16 or the CPU 12 has control of the Controller Bus 18 at any given time. When the CPU 12 does not need to access the Frame Buffer 14, as indicated by the status of Bus Arbitration Lines 32, the Arbitration Logic 24 takes control of the Controller Bus 18 and transfers data from the Frame Buffer 14 to the Display FIFO 28. When the CPU 12 needs to access the Frame Buffer 14, the CPU 12 requests control of the Controller Bus 18 by indicating the appropriate status on Bus Arbitration Lines 32. If the Display FIFO 28 is filled to or past a preset level, the Arbitration Logic 24 grants control of Controller Bus 18 to CPU 12 immediately by indicating the appropriate status on Bus Arbitration Lines 32. The CPU 12 then takes control of Controller Bus 18 and directly accesses Frame Buffer 14.

While the CPU 12 is accessing Frame Buffer 14, Video Shift Logic 26 can continue to output display data located in Display FIFO 28 to the Video Out output 30. In this manner the CPU 12 does not stop or upset the flow of display data out the Video Out output 30, even when the CPU 12 is accessing the Frame Buffer 14. CPU 12 may have to wait a short period of time after it requests control of Controller Bus 18 if the Display FIFO 28 is not filled to the required preset level, but this wait should be relatively short since the transfer of data from the Frame Buffer 14 to the Display FIFO 28 is in sequential fashion, which allows for quick transfers of large blocks of data.

While the invention has been described in its preferred embodiment, it is to be understood that the words which have been used are words of description rather than limitation, and that changes may be made within the purview of the appended claims without departing from the true scope and spirit of the invention in its broader aspects.

I claim:

1. A VGA Controller for driving an external display device comprising, in combination:
   a Frame Buffer memory having a Frame Buffer Bus;
   Display Controller means coupled to said Frame Buffer memory for reading display data contained in said Frame Buffer memory and for converting said display data to a serial format for driving said external display device;
   Central Processing Unit (CPU) means having a CPU Data Bus and having a Bus Arbitration coupled to said Display Controller means for allowing said CPU means to read and write said display data into said Frame Buffer memory;
   Controller Bus means comprising a single bus directly connected to said CPU Data Bus of said CPU means, to said Frame Buffer Bus of said Frame Buffer memory, and to said Display Controller means for providing a path to transfer said display data between said CPU means and said Frame Buffer memory and for providing a path to transfer said display data between said Frame Buffer memory and said Display Controller means; and said Display Controller means comprising, in combination:
   Arbitration Logic means coupled to said Bus Arbitration of said CPU means for determining when said CPU means may take control of said Controller Bus means in order to transfer said display data between said CPU means and said Frame Buffer memory;
   Display First-In First-Out (FIFO) means coupled to said Controller Bus means and to said Arbitration Logic means for permitting said Arbitration Logic means to transfer said display data from said Frame buffer memory into said Display FIFO means; and
   Video Shift Logic means electrically coupled to said Arbitration Logic means and to said Display FIFO means for permitting said Arbitration Logic means to transfer said display data stored in said Display FIFO means to said Video Shift Logic means which converts said display data to said serial format and shifts said display data out of said Display Controller means directly out of said VGA Controller means, which data in said serial format is used for driving said external display device;
   said Arbitration Logic means causing said display data in said Frame Buffer memory to be transferred to said Display FIFO means when said CPU means is not requesting control of said Controller Bus means by asserting the proper status on said Bus Arbitration of said CPU means;
   said Arbitration Logic means continuing to transfer said display data in said Frame Buffer memory to said Display FIFO means until said Display FIFO means is filled to a preset level; and
   said Arbitration Logic means granting control of said Controller Bus means to said CPU means when said CPU means requests said control by asserting the proper status on said Bus Arbitration, provided said Display FIFO is filled to said preset level.

2. A method for providing a VGA Controller for driving an external display device comprising the steps of:

providing a Frame Buffer memory having a Frame Buffer Bus;

providing Display Controller means coupled to said Frame Buffer memory for reading display data contained in said frame Buffer Memory and for converting said display data to a serial format for driving said external display device;

providing Central Processing Unit (CPU) means having a CPU Data Bus and having a Bus Arbitration coupled to said Display Controller means for allowing said CPU means to read and write said display data into said Frame Buffer memory;

providing Controller Bus means comprising a single bus directly connected to said CPU Data Bus of said CPU means, to said Frame Buffer Bus of said Frame Buffer memory, and to said Display Controller means for providing a path to transfer said display data between said CPU means and said Frame Buffer memory, and for providing a path to transfer said display data between said Frame Buffer memory and said Display Controller means; and said Display Controller means comprising, in combination:

Arbitration Logic means coupled to said Bus Arbitration of said CPU means for determining when said CPU means may take control of said Controller Bus means in order to transfer said display data between said CPU means and said Frame Buffer memory;

Display First-In First-Out (FIFO) means coupled to said Controller Bus means and to said Arbitration Logic means for permitting said Arbitration Logic means to transfer said display data from said Frame Buffer memory into said Display FIFO means; and Video Shift Logic means electrically coupled to said Arbitration Logic means and to said Display FIFO means for permitting said Arbitration Logic means to transfer said display data stored in said Display FIFO means to said Video Shift Logic means which converts said display to said serial format and shifts said display data out of said Display Controller means directly out of said VGA controller means, which data in said serial format is used for driving said external display device;

said Arbitration Logic means causing said display data in said Frame Buffer memory to be transferred to said Display FIFO means when said CPU means is not requesting control of said Controller Bus means by asserting the proper status on said Bus Arbitration of said CPU means;

said Arbitration Logic means continuing to transfer and display data in said Frame Buffer memory to said Display FIFO means until said Display FIFO means is filled to a reset level; and said Arbitration Logic means granting control of said Controller Bus means to said CPU means when said CPU means requests said control by asserting the proper status on said Bus Arbitration, provided said Display FIFO is filled to said preset level.

* * * * *